United States Patent
Uebergang

(10) Patent No.: US 7,487,809 B2
(45) Date of Patent: Feb. 10, 2009

(54) TREE PRUNING APPARATUS

(75) Inventor: Colin Uebergang, Robertson (AU)

(73) Assignee: Aust Pacific Forest Management Pty Ltd (AU)

( * ) Notice: Subject to any disclaimer, the term of this patent is extended or adjusted under 35 U.S.C. 154(b) by 0 days.

(21) Appl. No.: 10/570,730

(22) PCT Filed: Sep. 3, 2004

(86) PCT No.: PCT/AU2004/001193

§ 371 (c)(1),
(2), (4) Date: Dec. 11, 2006

(87) PCT Pub. No.: WO2005/022981

PCT Pub. Date: Mar. 17, 2005

(65) Prior Publication Data

US 2007/0095430 A1    May 3, 2007

(30) Foreign Application Priority Data

Sep. 4, 2003   (AU) ............................... 2003904810

(51) Int. Cl.
*B27L 1/00* (2006.01)
(52) U.S. Cl. ...................... 144/338; 144/394; 144/404; 144/208.1

(58) Field of Classification Search ............. 144/208.1, 144/208.2, 24.13, 382, 391, 394, 402, 404, 144/338
See application file for complete search history.

(56) References Cited

U.S. PATENT DOCUMENTS

| 2,477,922 | A | * | 8/1949 | Emery et al. ............. 144/208.8 |
| 2,581,479 | A | * | 1/1952 | Grasham ................. 47/1.01 R |
| 3,117,401 | A | * | 1/1964 | Talley ........................ 451/415 |
| 6,729,372 | B1 | * | 5/2004 | Koster et al. ............... 144/343 |

FOREIGN PATENT DOCUMENTS

| EP | 0407322 | * | 1/1991 |
| EP | 0538161 | * | 4/1993 |
| WO | WO92/14353 | * | 9/1992 |

* cited by examiner

*Primary Examiner*—Shelley Self
(74) *Attorney, Agent, or Firm*—Gifford, Krass, Sprinkle, Anderson & Citkowski, P.C.

(57) ABSTRACT

A pruning assembly (10) including an elongate supporting body (not shown), right (11) and left (12) jaw members hinged together and movable along the supporting body and each having three sets of blade members (31) mounted on actuator means (16) and alternatively displaced above and below a plane to form two staggered rows of three bores each, the actuator means (16) adapted to maintain the clearance between the trunk and each set of blade members (31).

23 Claims, 5 Drawing Sheets

TREE PRUNING APPARATUS

This invention relates to tree pruning apparatus.

This invention has particular but not exclusive application to tree pruning apparatus for plantation forestry species such as *Pinus radiata* and especially high value species such as *Araucaria cunninghamii*, and for illustrative purposes reference will be made to such application. However, it is to be understood that this invention could be used in other applications, such as tree pruning other forestry species where excision of lower limbs is required to add value.

PRIOR ART

In the farming of *Araucaria cunninghamii* (hoop pine) and other species there is a commercial advantage in pruning the lower branch sprouts to prevent them forming knots in the timber and to focus growth effort of the crown in to producing clear timber. As a manual task the pruning of trees is a labour intensive process. A mechanised means of pruning is thus of great commercial interest. An intuitive approach to tree pruning has been developed by CSIRO. This technology comprises an openable collar bearing hydraulically disposed chisel portions and operated by a hoisting mechanism to prune a forestry tree from the lower branches to branches at a selected height.

The disadvantages of this construction reside in the fact that the chisels are adjusted and fixed for the tree at the beginning of the stroke. Many species bud limbs from nodules on the extended trunk. In the case of hoop pine, the budding structures form the distinctive hoops that give the hoop pine its common name. The setting of the chisels must avoid the scalping of the bark at the hoops. However since trees generally taper from the base, the collar may be oversized for the upper limbs to avoid scalping lower down. The effective oversize for the upper limbs results in ineffective abscission of limbs higher up the trunk.

BRIEF DESCRIPTION OF THE INVENTION

This invention in one aspect resides broadly in tree pruning apparatus including:

an elongate supporting body locatable alongside the trunk of a tree to be pruned;

a pruning assembly mounted on and drivable along said supporting body and comprising a plurality of pruning jaws movable from an open position and a closed position substantially encircling the trunk;

a plurality of blade members mounted on said jaws and having cutting edges forming a substantially circumferential array when said jaws are in their closed position; and actuator means associated with each said blade member and adapted to dynamically maintain the clearance between the trunk and each said cutting edge.

In a further aspect his invention resides broadly in a tree pruning method including the steps of:

locating an elongate supporting body alongside the trunk of a tree to be pruned;

closing pruning jaws of a pruning assembly mounted on and drivable along said supporting body to substantially encircle the trunk, said jaws mounting a plurality of blade members having cutting edges forming a substantially circumferential array, the blade members being dynamically maintained as to clearance between the trunk and each said cutting edge by actuator means associated with each said blade member; and driving said pruning assembly along said elongate supporting body to prune said tree.

DESCRIPTION OF INVENTION

The elongate supporting body may include a wheeled or tracked vehicle for locating the body adjacent the tree trunk. The vehicle may be a powered vehicle or may be hand operated. For example, the vehicle may be a gyro-stabilized horizontal transport platform. The elongate support body may mount the pruning assembly by any suitable means. For example the body member may be configured as a vertical track or chain along which the pruning assembly is captively mounted for rolling. The rolling pruning assembly may be urged along the vertical track by a chain drive, ram or hydraulic, pneumatic or electric motor.

The jaws of the pruning assembly may comprise a pair of jaws hinged together or each pivoted from a carrier portion engaging the pruning assembly with the elongate supporting body. Where the jaws are hinged together, one jaw may be associated with the elongate support. The jaws may be operable by any suitable means such as manually or by hydraulic or pneumatic actuation.

The actuators for each of the blade members may be operable to maintain a selected clearance, preferably in the region of 4 to 10 mm, by any suitable means. For example the actuators may comprise a mechanical sensor arm adapted to roll along the trunk below or above the blade and serves to control the positioning of the blade by limiting the extent to which the blade may move toward and away from the trunk. The actuator may be under the control of electronic or opto-electronic distance sensing means performing the same function.

The actuator may comprise an electric, pneumatic or hydraulic actuator. Preferably the actuator is a pneumatic actuator to utilize the elasticity of the working fluid. The use of pneumatic actuation comprising a spring/air actuator enables the apparatus to be operated at high speed whilst allowing some inherent compliance to reduce inertial "blocking". Thus for a given sensed position of the blade, rapid changes of section may be taken up in part by the compliance in the actuator to preserve limb nodules and other cambium-containing portions of the trunk whilst ensuring effective excision of the limbs. Thus suitable commercial fast-response pneumatic actuators may be fine tuned as to operating pressure, such as at pressures of 10 to 50 psi.

The selected dynamically maintained distance between the blades and the trunk will be selected having regard to the tree species, the nodule size and the response rate of the actuators. For example, for high speed operation on species with large nodules, the clearance may be set quite high.

It is particularly desirable to configure the apparatus for speed of operation that is quite high relative to the speed of operation of prior art apparatus. In practice it has been determined that apparatus of the present invention may be operated at a linear blade edge velocity of from 1 to 2.5 m/sec, the actual speed being selected to deliver the best compromise between blade positioning response rate and an axe-like chopping effect on the limbs to be excised.

Preferred embodiments of the invention utilize pneumatic sensor/actuators, where a spring biased blade member is urged toward the trunk against the spring by a pneumatic actuator which is continuously operable in response to a follower interacting with the tree trunk.

The blade members may have straight cutting edges or the cutting wedges may be arcuate such that at a best average disposition of the blade members the cutting edges describe in combination a substantially circular cutting edge in plan. Conventional wisdom would have the cutting edge of the blades being of chisel-edges form, that is, with a substantially sheer face toward the trunk and a bevel from the cutting edge to the thickness of the blade body. In fact this configuration does provide an appropriate blade for many tree species. However, it has been determined that for certain species a modest relief of the sheer face of the blade produces better results for certain species. For example it has been determined that for blade velocities of about 1.0 to 2.5 m/sec, relieving the edge by 6° from the sheer plane for hoop pine produces a cleaner shearing of the excised limbs, whereas no relief (0°) works for eucalypts and *P. radiata*.

In forming the working circumference of the apparatus the blade members must have gaps between them to accommodate changes in adjusted size, if these are arrayed in a single circumferential plane. Limbs may fail to be sheared cleanly if they pass into a gap to be merely bruised or brushed aside by the supporting collar structure. Accordingly it is preferred that the blade members be arrayed in two or more planes with overlapping edges in plan. Accordingly in a further aspect this invention resides broadly in tree pruning apparatus including:

an elongate supporting body locatable alongside the trunk of a tree to be pruned;

a pruning assembly mounted on and drivable along said supporting body and comprising a plurality of pruning jaws movable from an open position and a closed position substantially encircling the trunk; and a plurality of blade members mounted on said jaws and having cutting edges in circumferentially overlapping relation when said jaws are in their closed position.

In a further aspect his invention resides broadly in tree pruning method including the steps of:

locating an elongate supporting body alongside the trunk of a tree to be pruned;

closing pruning jaws of a pruning assembly mounted on and drivable along said supporting body to substantially encircle the trunk, said jaws mounting a plurality of blade members having cutting edges in circumferentially overlapping relation; and driving said pruning assembly along said elongate supporting body to prune said tree.

The blade members may achieve the required circumferential overlap of extent of the cutting edges in use by means of being vertically staggered. For example the blade members may be disposed in two or more circumferential arrays stacked on the jaws, the arrays being offset in their circumferential disposition to present a substantially continuous cutting edge in plan. The blade members may have straight cutting edges or the cutting wedges may be arcuate such that at a best average disposition of the blade members the cutting edges describe in combination a substantially circular cutting edge in plan.

BRIEF DESCRIPTION OF THE DRAWINGS

In order that this invention may be more readily understood and put into practical effect, reference will now be made to the accompanying drawings which illustrate a preferred embodiment of the invention and wherein.

DETAILED DESCRIPTION OF THE PREFERRED EMBODIMENTS

Figure 1:
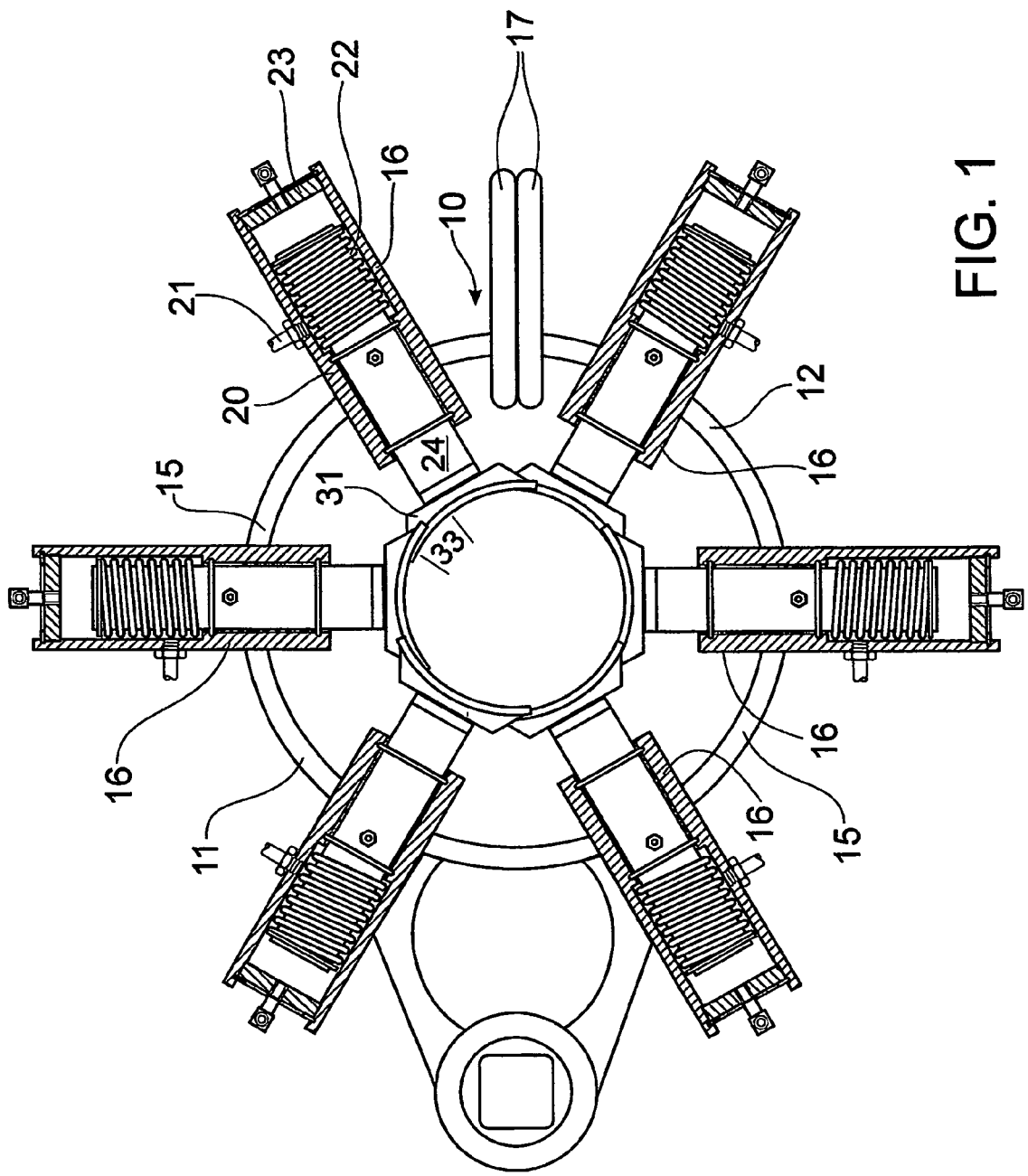
FIG. 1 is a plan view of pruning apparatus in accordance with the present invention.

In the figures, there is provided tree pruning apparatus having a pruning assembly 10 including right 11 and left 12 jaw members. The jaw members 11, 12 are hinged together to a lift carriage (not shown) by a common pin 18 passing into bores 14. The jaw members 11 and 12 have substantially semicircular bodies 15 and each have three actuator mounting bores 16 formed therein. At the ends of the jaw members 11, 12 remote from the bores 14 are respective stop portions 17 limiting the closure of the jaw members 11, 12. The jaw members in assembly are opened and closed by a double action actuator (not shown).

Figure 2:
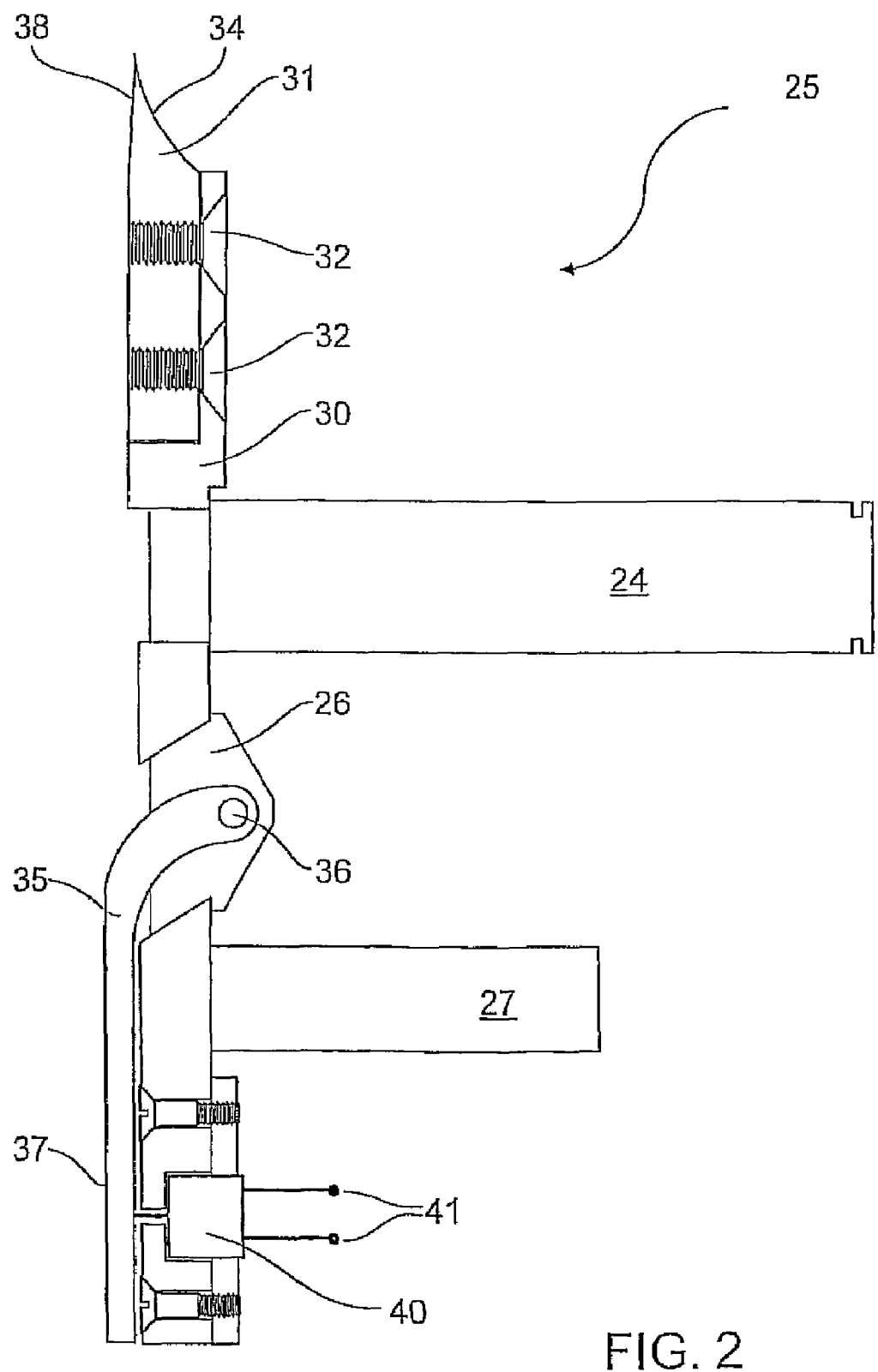
FIG. 2 is a detail view of a blade assembly for use with the apparatus of FIG. 1.
Figure 3:
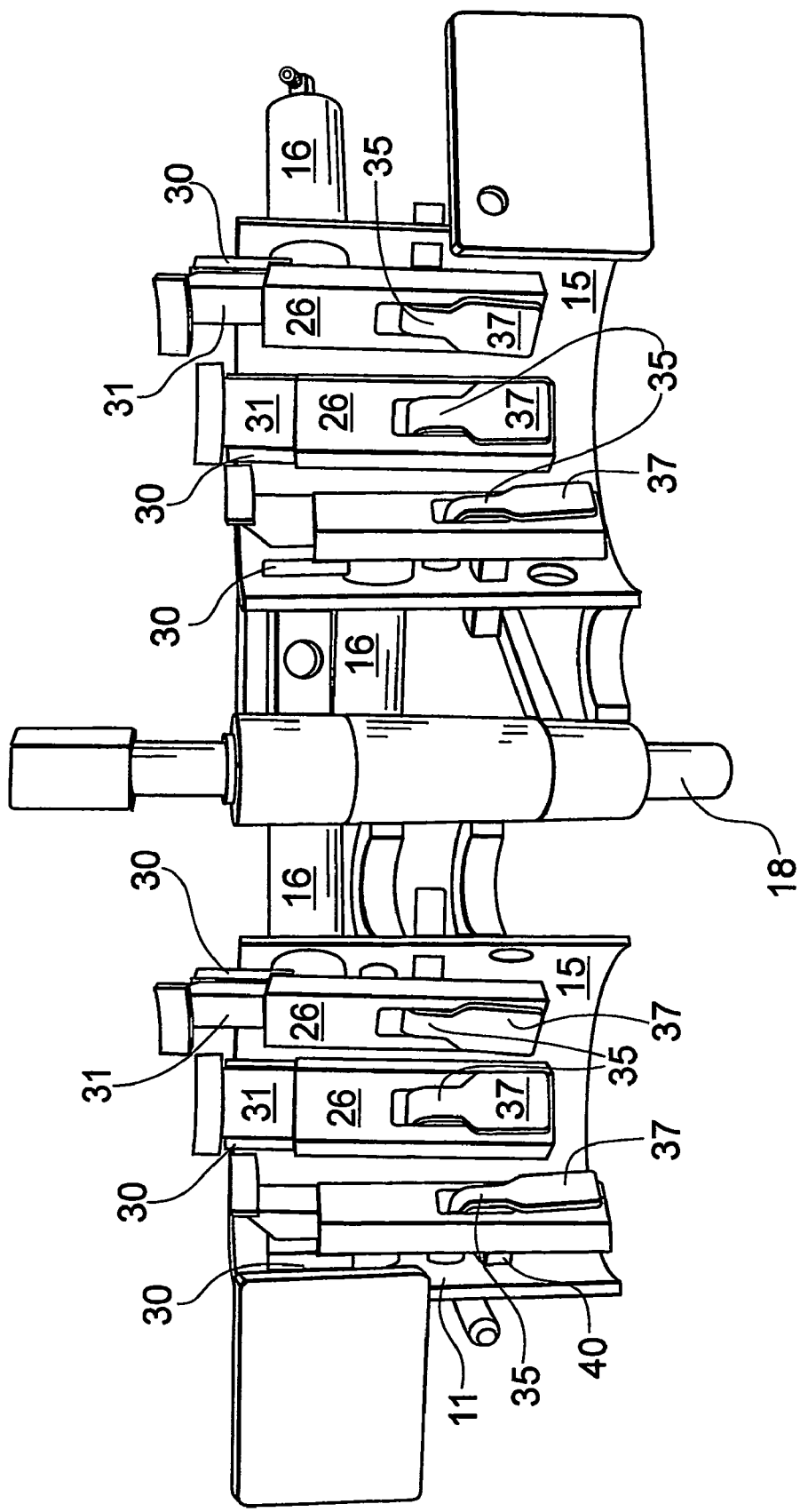
FIG. 3 is a front perspective view of the apparatus of FIG. 1, inoperatively open.
Figure 4:
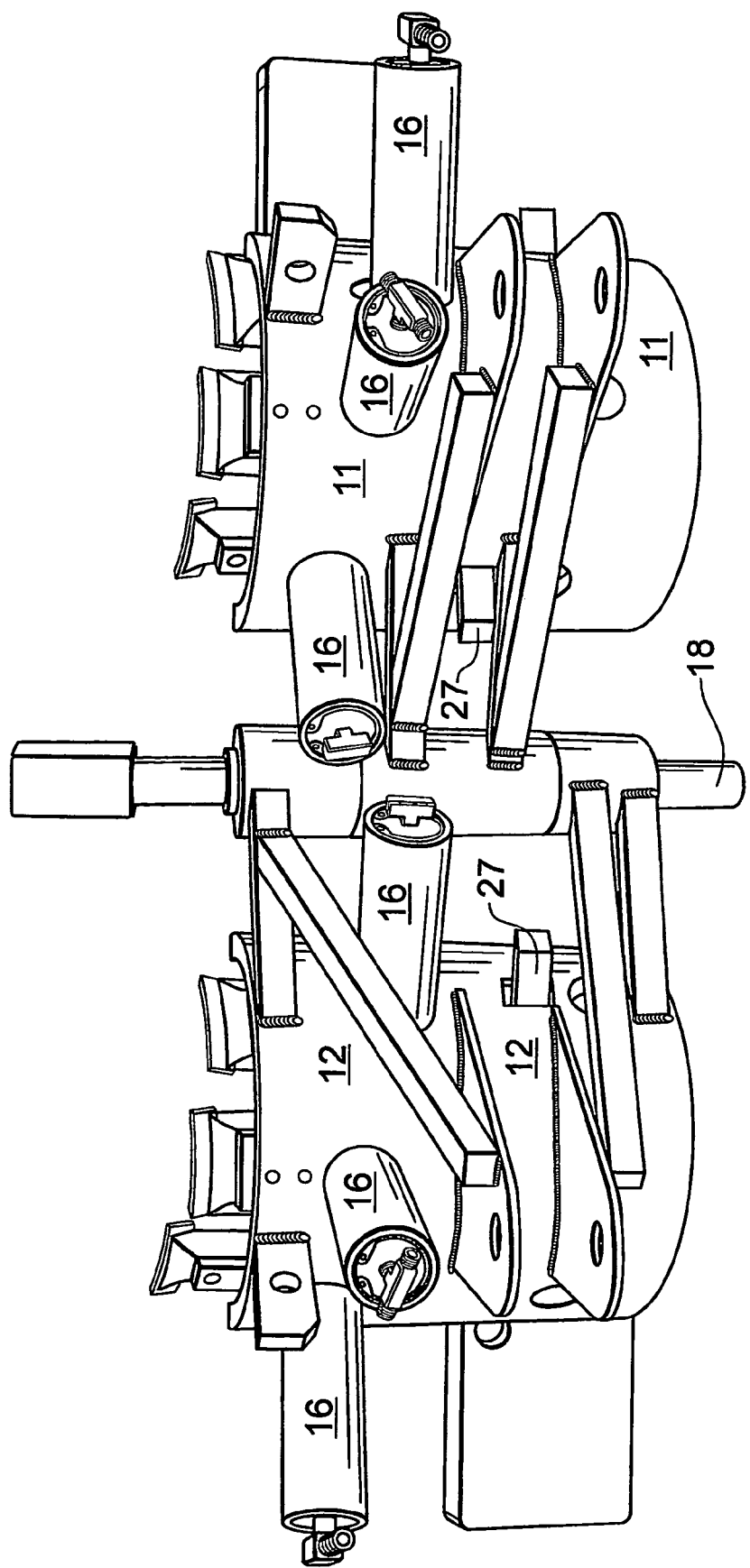
FIG. 4 is a rear perspective view of the apparatus of FIG. 1, inoperatively open.
Figure 5:
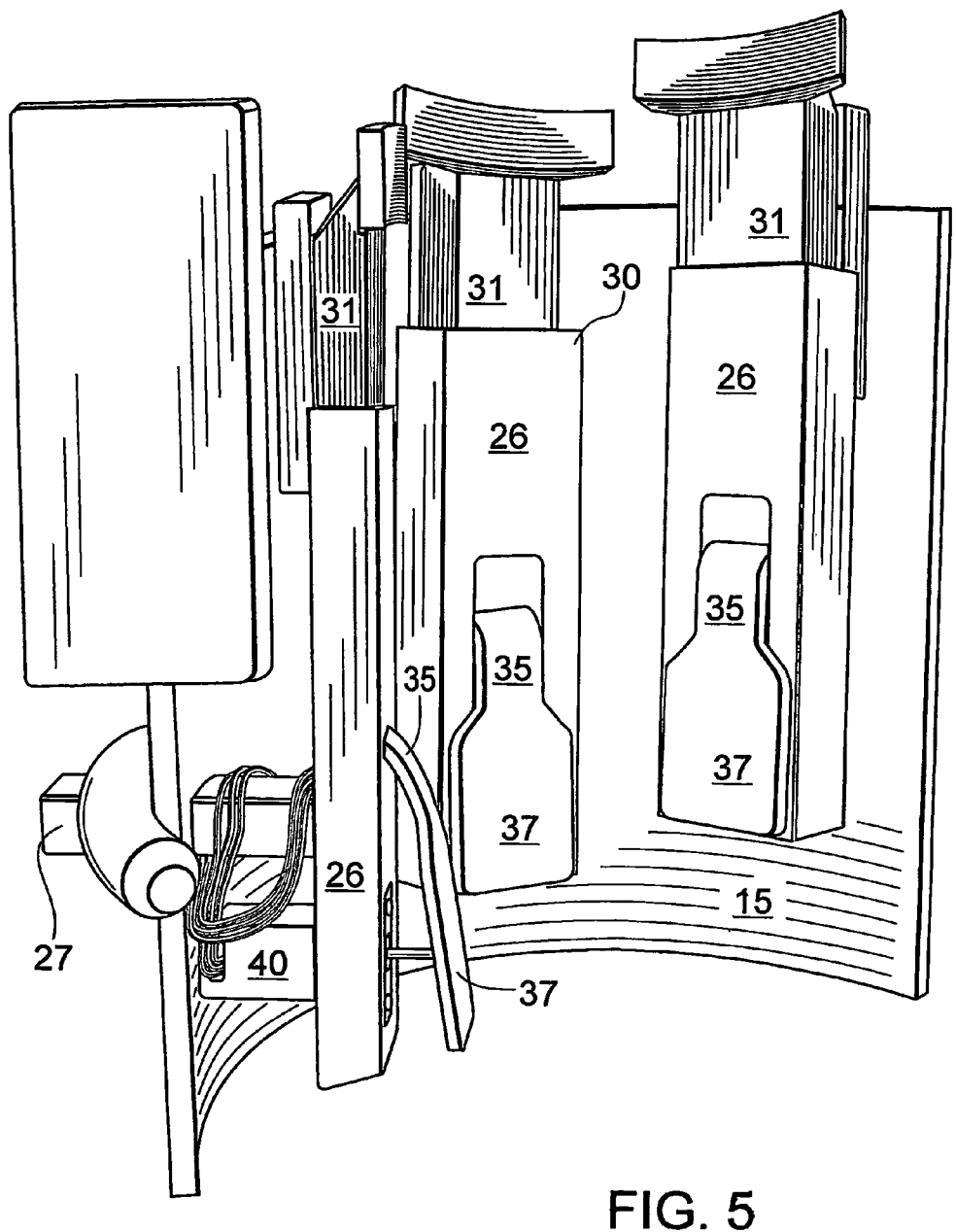
FIG. 5 is a detail perspective view of a jaw of the apparatus of FIG. 1.

The six actuator mounting bores 16 in the assembly of the jaw members are alternately displaced above and below a plane to form two staggered rows of three bores each. Welded into the bores 16 are actuator housings 20 having controlled air supplies 21, a bias spring 22 and end caps 23. Mounted in the housings 20 and forming a part of the actuator are pistons 24 each forming part of a blade and gauge assembly 25 best illustrated in FIG. 2. The jaw members 11, 12 have a guide bore (not shown) located in spaced relation below each actuator mounting bore 16.

Each blade and gauge assembly 25 comprises a body member 26 welded to the piston 24 and a guide rod 27 welded to the body member 26 in spaced, parallel relation to the piston 24, the guide rod being adapted to engage for sliding in the corresponding guide bore of the jaw member 11 or 12. The upper end of the body member 26 is configured as a blade mounting portion 30 to which an arcuate blade 31 is secured by machine screws 32.

The arcuate blade 31 is of circumferential extent such that in plan the respective blade edges of adjacent blades 31 overlap such as at the region 33 of FIG. 1. The cutting edge of the blade 31 is essentially a chisel edge with a bevel 34 and having a relief angle at the substantially sheer face of about 7° at 38. The bias springs 22 biases the body members 26 out from the tree in use, and whereby operation of the actuator urges the body members toward the tree in use.

The body member 26 pivotally mounts a mechanical follower 35 at 36. The mechanical follower 35 has a contact face 37 adapted to follow the tree trunk and operating a transducer 40 outputting a relational signal to terminals 41. The signal output from the terminals 41 are used to operate control means (not shown), which in turn operated the air supplies 21 to dynamically adjust the blade clearance from the trunk for each actuator.

Apparatus in accordance with the foregoing embodiment has the advantages that the blade clearance is constantly adjusted on installation of the jaw members about the tree and during the pruning action. The individual control of the clearance accommodates out-of-round trunks as well as maintaining the cutting distance. The overlapping plan of the blade edges prevents limbs from passing between cutting edges, resulting in a cleanly pruned tree. The use of air actuators allows for reflexive adjustment in the face of inertia of the relatively heavy blade parts.

It will of course be realised that while the above has been given by way of illustrative example of this invention, all such and other modifications and variations thereto as would be apparent to persons skilled in the art are deemed to fall within the broad scope and ambit of this invention as defined in the claims appended hereto.

The invention claimed is:

1. A tree pruning apparatus including:
an elongate supporting body locatable along the trunk of a tree to be pruned;
a pruning assembly mounted on and drivable along said supporting body and comprising a plurality of pruning jaws movable between an open position and a closed position substantially encircling the trunk; and
a plurality of blade assemblies mounted on said jaws, each of said blade assemblies having a blade member with a cutting edge, an actuator adapted to move said blade member, and a sensor operably connected to said actuator to cause said actuator to move said blade member to dynamically maintain a selected clearance between the trunk and said cutting edge.

2. The tree pruning apparatus according to claim 1, wherein at least one of said jaws is of fixed shape.

3. The tree pruning apparatus according to claim 1, wherein said jaws move within the same horizontal plane.

4. The tree pruning apparatus according to claim 1, wherein said actuators are independently operable.

5. The tree pruning apparatus according to claim 1, wherein said blade assemblies on one of said jaws are in fixed position relative to one another.

6. The tree pruning apparatus according to claim 1, wherein said jaws of the pruning assembly comprise a pair of jaws hinged together.

7. The tree pruning apparatus according to claim 6, wherein one of said jaws is mounted for movement on said elongate supporting body.

8. The tree pruning apparatus according to claim 1, wherein said jaws are each pivoted from a carrier portion engaging said elongate supporting body.

9. The tree pruning apparatus according to claim 1, wherein said jaws are pneumatically operable.

10. The tree pruning apparatus according to claim 1, wherein said sensor comprises a mechanical sensor arm adapted to move along the trunk ahead of said blade member.

11. The tree pruning apparatus according to claim 1, wherein said sensor is electronic and adapted to send a signal to said actuator.

12. The tree pruning apparatus according to claim 1, wherein said actuator is a pneumatic actuator.

13. The tree pruning apparatus according to claim 12, further comprising a spring operably connected to said sensor, said spring working against said pneumatic actuator.

14. The tree pruning apparatus according to claim 1, wherein said pruning assembly is operable to be driven along said elongate body member in use at a linear blade edge velocity of from approximately 1 to 2.5 m/sec.

15. The tree pruning apparatus according to claim 13, wherein said pneumatic actuator and spring comprise a sensor/actuator assembly, wherein said blade member is urged toward the trunk against the bias of said spring by said pneumatic actuator which is continuously operable in response to said sensor.

16. The tree pruning apparatus according to claim 1, wherein said blade members have arcuate cutting edges.

17. The tree pruning apparatus according to claim 16, wherein said cutting edges form a substantially circular cutting edge when in the closed position.

18. The tree pruning apparatus according to claim 16, wherein said blade members are arrayed in overlapping arrangement when in the closed position.

19. The tee pruning apparatus according to claim 1, wherein said blade members have a cutting edge of chisel-edged form with a substantially sheer face toward the trunk in use and a bevel from the cutting edge to the thickness of the blade body.

20. The tree pruning apparatus according to claim 19, wherein said sheer face is relieved along said cutting edge at a relief angle of up to 6°.

21. A tree pruning method including:
locating an elongate supporting body alongside the trunk of a tree to be pruned;
closing pruning jaws of a pruning assembly mounted on and drivable along said supporting body to substantially encircle the trunk, said jaws mounting a plurality of blade members having cutting edges;
driving said pruning assembly along said elongate supporting body to prune said tree; and
independently moving two adjacent blade members relative to one another as the pruning assembly is driven along the elongate supporting body.

22. A tree pruning apparatus including:
an elongate supporting body locatable alongside the trunk of a tree to be pruned;
a pruning assembly mounted on and drivable along said supporting body and comprising a plurality of pruning jaws movable between an open position and a closed position substantially encircling the trunk;
a plurality of blade members mounted on said jaws, said blade members each having cutting edges;
a plurality of actuators operably connected to said blade members; and
a plurality of electronic sensors, said sensors being adapted to signal said actuators to move said blade members to dynamically maintain a selected clearance between the trunk and each said cutting edges.

23. A tree pruning method including the steps of:
locating an elongate supporting body alongside the trunk of a tree to be pruned;
closing pruning jaws of a pruning assembly mounted on and drivable along said supporting body to substantially encircle the trunk, said jaws mounting a plurality of blade members having cutting edges;
driving said pruning assembly along said elongate supporting body;
electronically sensing the trunk of the tree as the pruning assembly is driven along the elongate supporting body; and
individually moving one or more of said blade members in response to a signal from the electronic sensing.

\* \* \* \* \*